United States Patent [19]

Taylor

[11] Patent Number: 5,235,808

[45] Date of Patent: Aug. 17, 1993

[54] EXHAUST NOZZLE INCLUDING IDLE THRUST SPOILING

[75] Inventor: John B. Taylor, Cincinnati, Ohio

[73] Assignee: General Electric Company, Cincinnati, Ohio

[21] Appl. No.: 865,529

[22] Filed: Apr. 9, 1992

Related U.S. Application Data

[62] Division of Ser. No. 479,503, Feb. 12, 1990, Pat. No. 5,140,809.

[51] Int. Cl.$^5$ .............................................. F02K 1/00
[52] U.S. Cl. ................................. 60/271; 239/265.19
[58] Field of Search ................... 60/226.3, 230, 271; 239/265.19, 265.33, 265.35, 265.37, 265.39, 265.41

[56] References Cited

U.S. PATENT DOCUMENTS

| | | | |
|---|---|---|---|
| 2,846,843 | 8/1958 | Clark et al. | 60/242 |
| 2,846,844 | 8/1958 | O'Rourke | 239/265.35 |
| 2,880,575 | 4/1959 | Scialla | 239/265.37 |
| 2,926,491 | 3/1960 | Hyde | 60/35.6 |
| 3,454,227 | 7/1969 | Motycka | 239/265.39 |
| 3,807,637 | 4/1974 | Camboulives et al. | 239/265.41 |
| 3,954,225 | 5/1976 | Camboulives et al. | 239/265.41 |
| 4,037,405 | 7/1977 | Huenninger et al. | 60/229 |
| 4,049,199 | 9/1977 | Nightingale | 239/265.39 |
| 4,091,613 | 5/1978 | Young | 60/39.07 |
| 4,128,208 | 12/1978 | Ryan et al. | 239/265.39 |
| 4,141,501 | 2/1979 | Nightingale | 239/265.39 |
| 4,176,792 | 12/1979 | McCardle, Jr. | 239/265.41 |
| 4,245,787 | 1/1981 | Freid | 239/265.41 |
| 4,279,382 | 7/1981 | Wilson, Jr. | 239/11 |
| 4,392,615 | 7/1983 | Madden | 239/265.37 |
| 4,420,932 | 12/1983 | Mendez et al. | 60/230 |
| 4,456,178 | 6/1984 | Jones et al. | 239/265.39 |
| 4,463,903 | 8/1984 | Nightingale | 239/265.17 |
| 4,466,573 | 8/1984 | Camboulives et al. | 239/265.41 |
| 4,587,806 | 5/1986 | Madden | 60/271 |
| 4,605,169 | 8/1986 | Mayers | 239/265.29 |
| 4,884,748 | 12/1989 | Ward et al. | 60/230 |
| 4,994,660 | 2/1991 | Hauer | 239/265.41 |
| 5,082,182 | 1/1992 | Bruchez, Jr. et al. | 239/265.19 |

FOREIGN PATENT DOCUMENTS

| | | |
|---|---|---|
| 0275757 | 7/1988 | European Pat. Off. . |
| 2711217A | 3/1977 | Fed. Rep. of Germany . |
| 3216691A | 5/1982 | Fed. Rep. of Germany . |
| 0782494 | 9/1957 | United Kingdom . |
| 1561138 | 2/1980 | United Kingdom . |
| 2230239 | 10/1990 | United Kingdom . |
| 2241540 | 9/1991 | United Kingdom .................. 60/271 |

OTHER PUBLICATIONS

Irwin E. Treager, Aircraft Gas Turbine Engine Technology, 1970, 127–129.
A. Kuchar, "Variable Convergent-Divergent Exhaust Nozzle Aerodynamics", Ch14 of Air Force Aero Propulsion Laboratory Report AFAPL-TR-78-52, 1978, pp: cover 14, 14–i, 14–1 through 14–15.

Primary Examiner—Richard A. Bertsch
Assistant Examiner—Howard R. Richman
Attorney, Agent, or Firm—Jerome C. Squillaro

[57] ABSTRACT

A method and apparatus are disclosed for spoiling thrust from combustion gases discharged from an aircraft gas turbine engine at ground idle operating condition. The method comprises the step of positioning a secondary exhaust flap of the exhaust nozzle to form a diffuser for the combustion gases at the ground idle operating condition for maintaining attachment of the combustion gases along the secondary exhaust flaps for spoiling thrust. An exemplary and preferred exhaust nozzle is provided wherein the secondary exhaust flaps are positionable in part independently of primary exhaust flaps so that the primary and secondary flaps may be disposed together in different positions during ground idle, dry, and augmented operating conditions of the engine. Thrust spoiling allows the engine to be operated at relatively high core speeds for providing bleed-air at relatively high pressure or electrical power from a generator, or both, without attendant relatively high thrust from the engine at the ground idle operating condition.

8 Claims, 2 Drawing Sheets

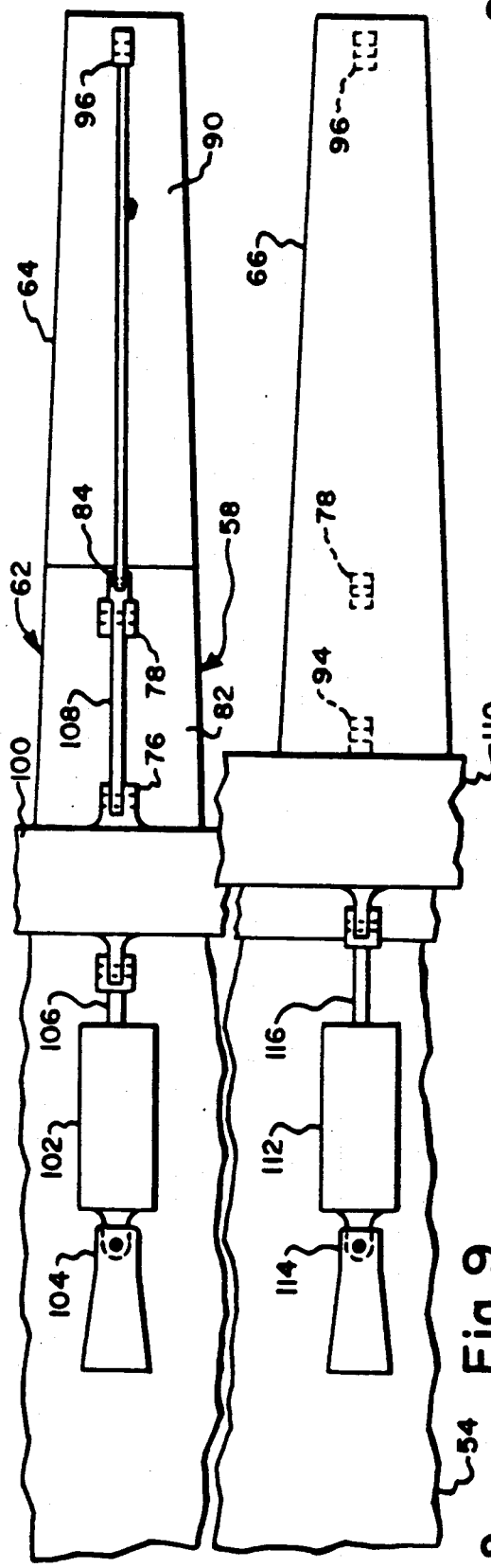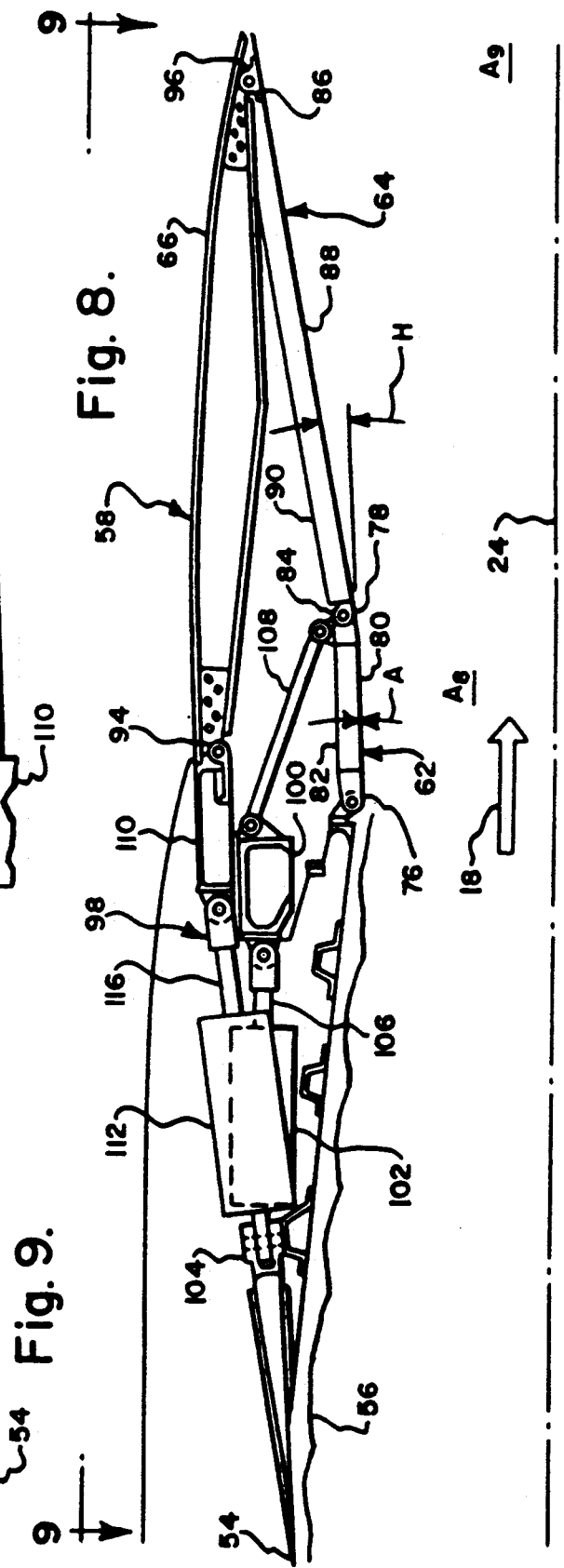

EXHAUST NOZZLE INCLUDING IDLE THRUST SPOILING

This is a division of application Ser. No. 07/479,503, filed Feb. 12, 1990 now U.S. Pat. No. 5,140,809.

TECHNICAL FIELD

The present invention relates generally to aircraft gas turbine engine variable exhaust nozzles, and, more specifically, to a means and method for spoiling ground idle thrust from such engines.

BACKGROUND ART

Conventional military fighter aircraft are powered by high performance gas turbine engines having relatively high thrust-to-weight ratio for providing high acceleration rates of the aircraft. The aircraft gas turbine engine typically includes a variable area converging-diverging exhaust nozzle at a downstream end of a conventional afterburner or augmenter. The exhaust nozzle includes primary and secondary exhaust flaps which define converging and diverging channels through which combustion gases from the engine are discharged for generating thrust.

The exhaust nozzle is conventionally positionable for generally two modes of operation: a dry engine operating condition, wherein the afterburner is deactivated, and the primary and secondary exhaust flaps are in a generally fully closed position; and a wet, or augmented operating condition wherein the afterburner is activated and burns additional fuel for providing increased thrust, and the primary and secondary flaps are in a generally fully open position. Of course, the exhaust nozzle primary and secondary flaps are also conventionally positionable at intermediate positions in each of the dry and wet modes.

A conventional military aircraft may also include an Environmental Control System (ECS) which requires extraction of engine compressor bleed-air at pressures typically at least 40 psia. Furthermore, the engine typically includes a generator requiring a minimum shaft rpm for providing electrical output power for the aircraft.

With the aircraft operating in take-off and cruise modes of operation and during dry and wet modes of operation, the engine is amply effective for providing the required ECS bleed-air as well as electrical power from the generator. Furthermore, the engine is operable in a conventional ground idle operating condition wherein the throttle is set back to a minimum thrust and power setting of the engine, which is typically less than about 6% maximum dry thrust of the engine. However, in order to obtain acceptable levels of ECS bleed-air and acceptable power from the generator, the ground idle operating condition requires a core engine speed typically of about 70% of maximum speed, although the conventional fan speed is substantially lower.

Since the engine is a high performance engine having a high thrust-to-weight ratio, this relatively high core speed results in substantial thrust from the engine during the ground idle operating condition. This thrust is typically sufficient for causing the aircraft to roll on the ground unless braking is utilized. Of course, such braking during ground idle operating condition, substantially increases wearing of the aircraft's brakes, tires and wheels. Furthermore, during icy runway and taxiway conditions, braking through the wheels is relatively ineffective for accommodating the ground idle operating condition thrust.

Yet further, these aircraft are typically operated world wide and operate on a wide variety of runways/taxiway surface conditions, including water and ice accumulation, and with varying degrees of ramp congestion of other aircraft. Under these conditions, a relatively low level of ground idle thrust is desirable for maintaining safe landing and taxiing speeds.

Accordingly, the aircraft's brakes, as above described, may be utilized for accommodating the relatively high ground idle thrust encountered during landing, taxiing, and standing, but this is generally undesirable in view of the increased wear associated therewith. Of course, the ground idle operating condition of the engine could be preselected for obtaining relatively low core engine speeds for reducing ground idle thrust from the engine. However, if the core engine speed is so reduced, acceptable ECS bleed-air and generator output will not be obtained from the engine, thus requiring an auxiliary compressor and generator. This is undesirable in view of the increased weight, cost and complexity of such systems in the aircraft.

OBJECTS OF THE INVENTION

Accordingly, one object of the present invention is to provide a method and apparatus for spoiling ground idle thrust from an aircraft gas turbine engine.

Another object of the present invention is to provide a new and improved variable area gas turbine engine exhaust nozzle.

Another object of the present engine is to provide a gas turbine engine exhaust nozzle having primary and secondary exhaust flaps positionable for spoiling ground idle thrust from the engine.

Another object of the present invention is to provide an aircraft gas turbine engine exhaust nozzle effective for providing acceptable levels of ECS bleed-air at ground idle operating condition while spoiling ground idle thrust.

Another object of the present invention is to provide an aircraft gas turbine engine exhaust nozzle operable in wet and dry modes, and operable in a ground idle operating condition wherein ground idle thrust from the engine requires reduced amounts of wheel braking for preventing an aircraft from rolling on its wheels.

DISCLOSURE OF INVENTION

The invention includes a method and apparatus for spoiling ground idle thrust from an aircraft gas turbine engine. The apparatus includes a variable area gas turbine engine exhaust nozzle having primary and secondary exhaust flaps which are positionable differently during ground idle, dry, and augmented operating conditions of the engine. The apparatus is effective for practicing the method of positioning a secondary exhaust flap to form a diffuser for spoiling thrust from combustion gases at the ground idle operating condition and is effective for maintaining attachment of the combustion gases along the secondary exhaust flaps.

BRIEF DESCRIPTION OF DRAWINGS

The novel features believed characteristic of the invention are set forth and differentiated in the claims. The invention, in accordance with a preferred, exemplary embodiment, together with further objects and advantages thereof, is more particularly described in the following detailed description taken in conjunction with the accompanying drawings in which:

FIG. 8 is a partly schematic, transverse sectional view of the upper half of the exhaust nozzle illustrated in FIG. 2.

FIG. 9 is a partly schematic, plan view of portions of the exhaust nozzle illustrated in FIG. 8 taken along line 9—9.

MODE(S) FOR CARRYING OUT THE INVENTION

Figure 1:
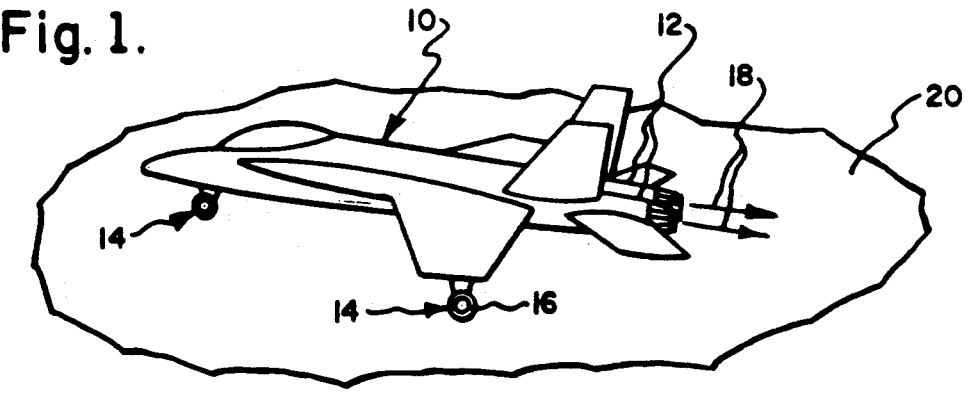
FIG. 1 is a schematic representation of an aircraft having two turbofan gas turbine engines including exhaust nozzles in accordance with one embodiment of the present invention.

Illustrated in FIG. 1 is a schematic representation of a high performance, military fighter aircraft 10 including two turbofan gas turbine engines 12 in accordance with a preferred, exemplary embodiment of the present invention. The aircraft 10 includes a plurality of conventional, retractable, wheels 14 and conventional brakes 16 operatively connected thereto. The engines 12 are effective for generating combustion gases 18 which are effective for providing thrust to power the aircraft 10. In FIG. 1, the aircraft 10 is shown as taxiing on a runway 20 under the power of the combustion gases 18.

Figure 2:
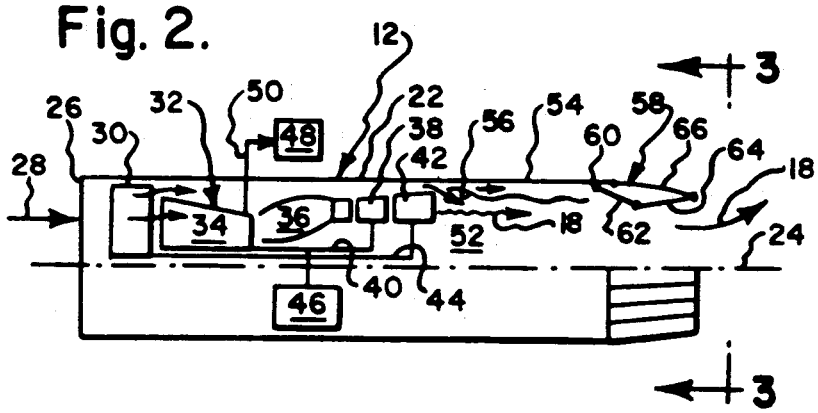
FIG. 2 is a schematic representation of one of the engines, including an exhaust nozzle, powering the aircraft illustrated in FIG. 1.

Illustrated in FIG. 2 is one of the identical turbofan engines 12 illustrated in FIG. 1, shown schematically. The engine 12 includes an annular casing 22 disposed coaxially about a longitudinal centerline axis 24. The engine 12 further includes a conventional inlet 26 for receiving ambient air 28 and channeling the air 28 through a conventional fan 30. A conventional core engine 32 is disposed immediately downstream of the fan 30 and includes in serial flow communication, a conventional compressor 34, combustor 36, and high pressure turbine (HPT) 38. The HPT 38 powers the compressor 34 through a first shaft 40 fixedly connected therebetween.

The engine 12 further includes a conventional low pressure turbine (LPT) 42 disposed downstream from the HPT 38 and in flow communication therewith, for powering the fan 30 through a second shaft 44 extending therebetween. Conventionally operatively connected to the first shaft 40 is a conventional generator 46 for providing electrical power to the engine 12 and the aircraft 10. Conventionally operatively connected to the compressor 34 is a conventional Environmental Control System (ECS) 48 which receives bleed-air 50 from the compressor 34.

The engine 12 further includes a conventional afterburner, or augmenter 52 disposed downstream of the LPT 42. The afterburner 52 includes an annular casing, or tail pipe, 54 extending conventionally downstream from the casing 22. The afterburner 52 includes a conventional combustion liner 56 which confines the combustion gases 18.

The combustion gases 18 are formed from a portion of the inlet airflow 28 which is channeled through the core engine 32 wherein it is mixed with fuel and ignited in the combustor 36 and discharged through the HPT 38 and the LPT 42. Another portion of the inlet airflow 28 bypasses the core engine 32 to the afterburner 52 for cooling the liner 56. A portion of that airflow 28 is conventionally channeled radially inward of the liner 56. During a dry operating condition or mode of the engine 12, the afterburner 52 is deactivated and the combustion gases 18 discharged from the LPT 42 are passed through the afterburner 52 without any fuel addition. However, during a wet, or augmented operating condition or mode of the engine 12, additional fuel is conventionally added to the combustion gases 18 discharged from the LPT 42 and the portion of the airflow 28 bypassing the core engine 32 and channeled radially inwards of the liner 56, and conventionally ignited in the afterburner 52 for providing the combustion gases 18 with additional energy and velocity, and thereby thrust, for powering the engine 12 and the aircraft 10.

The engine 12 further includes an exhaust nozzle 58 in accordance with a preferred, exemplary embodiment of the present invention disposed at a downstream end 60 of the afterburner 52. In an exemplary embodiment, the exhaust nozzle 58 is axisymmetric about the longitudinal centerline axis 24 and includes a plurality of circumferentially spaced conventional primary exhaust flaps 62 and a plurality of circumferentially spaced conventional secondary exhaust flaps 64 extending downstream therefrom. A plurality of circumferentially spaced conventional fairings 66 join the secondary flaps 64 to the casing 54.

Figure 3:
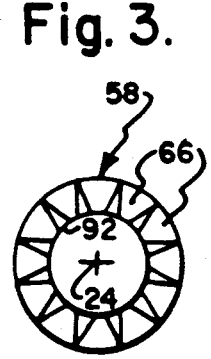
FIG. 3 is an end view of the engine illustrated in FIG. 2 taken along line 3—3 showing an upstream end view of the exhaust nozzle thereof.

FIG. 3 illustrates an upstream looking view of the exhaust nozzle 58 showing the axisymmetric arrangement of the fairings 66 behind which are hidden the primary and secondary flaps 62 and 64.

The engine 12 illustrated in FIG. 2 is operable at a ground idle operating condition or mode of minimum output thrust from the gases 18 discharged therefrom. The ground idle mode is preselected for obtaining a predetermined pressure of the bleed-air 50 acceptable for operating the aircraft Environmental Control System 48, which in the exemplary embodiment illustrated in a pressure of at least 40 psia. Furthermore, the ground idle mode is also selected for powering the generator 46 at a suitable rpm for providing an acceptable level of electrical output power therefrom. In the exemplary embodiment illustrated, the core engine first shaft 40 is operated at about 70% maximum speed thereof during the ground idle mode. The speed of the second shaft 44 and the fan 30 is substantially lower than the speed of the first shaft 40 during the ground idle mode as conventionally obtained.

Utilizing such a relatively high speed of the core engine first shaft 40 for the ECS 48 or the generator 46, or both, would result in undesirably high thrust from the combustion discharge gases 18 if a conventional exhaust nozzle were utilized. This would occur since a conventional variable area exhaust nozzle is typically configured for only two modes of operation: a dry mode of operation wherein the primary and secondary exhaust flaps thereof are generally closed, and an augmented mode of operation where the primary and secondary exhaust flaps thereof are in a generally open, converging-diverging position for obtaining generally optimum channeling of the high speed exhaust gases there through during wet operation. However, when an aircraft using such a conventional variable area exhaust nozzle lands and taxis and operates in a ground idle mode, the exhaust nozzle thereof is also positioned in the augmented mode even though the augmenter is not activated. This is done to provide a maximum discharge flow area from the exhaust nozzle at ground idle operating condition for reducing thrust from the engine. However, since the exhaust nozzle in its augmented mode is designed for the aerodynamic conditions occurring with an activated augmenter, when it is operated in such an augmented mode position at ground idle, it is being operated off-design. As a result, the thrust from the engine occurring during the ground idle mode, is relatively low when compared with flight operation of the engine, but is relatively high for ground propulsion of the aircraft and has a substantial absolute value.

In accordance with the preferred embodiment of the present invention, a method of spoiling, or reducing, thrust from the combustion gases 18 discharged from the exhaust nozzle 58 at the ground idle operating condition is provided. The method includes the step of positioning the secondary exhaust flaps 64, as illustrated schematically in FIG. 4, to form a diffuser 68 for the combustion gases 18 at the ground idle operating condition, with the diffuser being effective for maintaining attachment of the combustion gases 18, without flow separation, along the secondary exhaust flap 64. By diffusing the combustion gases 18 in the diffuser 68, the velocity thereof, and thusly, the thrust thereof, is reduced. In order to obtain acceptable diffusion without flow separation, the secondary exhaust flaps 64 must be positioned relative to the longitudinal centerline axis 24, and the combustion gases 18 flowing generally parallel thereto, at relatively shallow angles. The angle of the secondary exhaust flap 64 relative to the longitudinal centerline axis 24 is designated as half-angle H and preferably has a value up to about 15° for obtaining diffusion without flow separation.

A maximum amount of diffusion in a minimum amount of longitudinal extent is desired for keeping the exhaust nozzle 58 relatively short and thereby reducing its weight. However, if the half-angle H is too large, undesirable flow separation will occur with an attendant undesirable increase in thrust from the combustion gases 18 discharged from the exhaust nozzle 58. In order to ensure that separation of the combustion gases 18 does not occur, a preselected flow separation margin is desired which may be predetermined for particular design applications as desired and indicates the relative ability of the exhaust nozzle 58 to avoid flow separation. For example, an appropriate non-dimensional parameter of flow separation margin could have a value of 100% if the half-angle H were 0°, and would have a value of 0 if the half-angle H were selected to be that angle at which flow separation occurs. In order to obtain acceptable flow separation margin for the preferred embodiment of the invention, a half-angle H for the secondary exhaust flaps 64 of about 10° is preferred.

Figure 4:
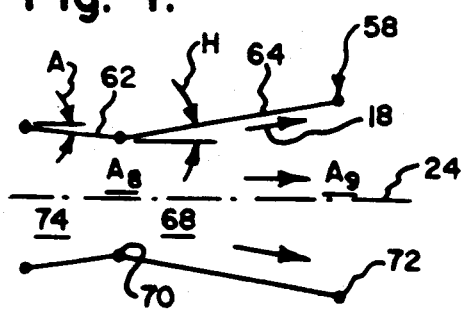
FIG. 4 is a schematic representation of the positions of the primary and secondary exhaust flaps of the exhaust nozzle of the engine illustrated in FIG. 2 during a ground idle operating condition in accordance with an exemplary embodiment of the present invention.

In the preferred embodiment of the invention, the method of spoiling thrust may further include the step of positioning the primary exhaust flaps 62 to a fully open position at the ground idle operating condition as also illustrated in FIG. 4. The position of the primary exhaust flaps 62 may be defined by the angle A which represents the inclination angle of the primary exhaust flaps 62 relative to the longitudinal centerline axis 24. In the preferred embodiment, the inclination angle A is relatively small and is preferably 0° at the fully open position of the primary exhaust flaps 62.

Defined at the junction of the primary and secondary flaps 62 and 64 is a conventional throat 70 of the exhaust nozzle 58 which has a relatively minimum flow area, conventionally denoted as $A_8$. With the primary exhaust flap 62 in a fully open position, the throat area $A_8$ is maximum. Since the secondary exhaust flaps 64 are connected to the primary exhaust flaps 62 they end at a conventional exhaust outlet 72 having a flow area conventionally denoted $A_9$. By positioning the primary exhaust flap 62 at a fully open position, and by positioning the secondary flap 64 for obtaining diffusion, the exhaust nozzle 58 provides a relatively large areas $A_8$ and $A_9$ for channeling the combustion gases 18 while spoiling thrust therefrom during the ground idle mode. With the inclination angle A being preferably 0 in this mode, the primary exhaust flap 62 is positioned generally parallel to the longitudinal centerline axis 54.

Unlike a conventional variable exhaust nozzle wherein the position of the primary and secondary exhaust flaps is typically the same during both a ground idle operating condition and an augmented operating conditon, an additional feature of the present invention is that the primary and secondary exhaust flaps 62 and 64 are disposed together in different positions during the ground idle operating condition and during the augmented operating condition, as well as during the dry operating condition of the engine 12.

More specifically, FIG. 4 illustrates the exhaust nozzle 58 during the ground idle operating condition to form the diffuser 68 as a diverging channel defined by and between the secondary exhaust flaps 64. The primary exhaust flaps 62 are positioned generally parallel to the longitudinal centerline 64 and define therebetween a generally constant area flow channel 74. In alternate embodiments of the invention, the flow channel 74 may be slightly converging with inclination angles A up to about 5° without significantly adversely affecting the ability of the secondary exhaust flaps 64 to spoil thrust.

Figure 5:
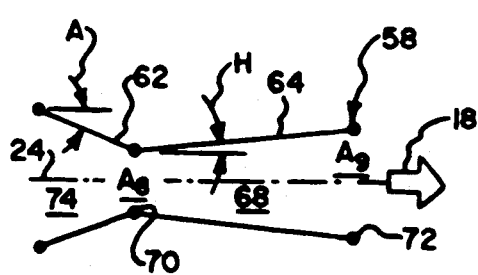
FIG. 5 is a schematic representation of the positions of the primary and secondary exhaust flaps of the exhaust nozzle of the engine illustrated in FIG. 2 during a dry operating condition of the engine.

Illustrated in FIG. 5, is the exhaust nozzle 58 positioned during the dry operating condition or mode of the engine 12 to form generally fully closed converging and diverging channels 74 and 68, defined between the primary and secondary exhaust flaps 62 and 64, respectively, for powering the aircraft 10 in flight at intermediate levels of thrust greater than the thrust at the ground idle operating condition. The converging flow channel 74 formed by the primary flaps 62 during the dry mode, is considered generally fully closed since the flow area $A_8$ at the throat 70 has relatively minimum values as compared to the other modes of operation of the engine 12. The inclination angle A of the primary flap 62 is about 35° during such dry operation, and of course may vary during such dry operation. The diverging channel 68 is also considered generally closed since the outlet area $A_9$ is also at a relatively minimum value with the half-angle H having values approaching about 7°.

Figure 6:
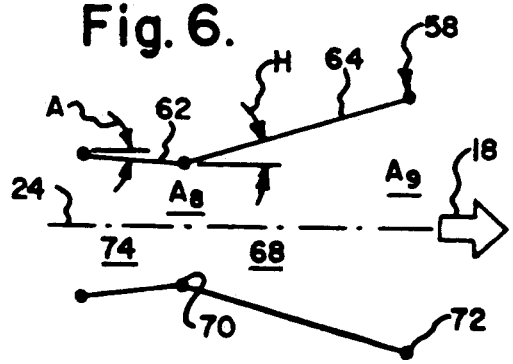
FIG. 6 is a schematic representation of the positions of the primary and secondary exhaust flaps of the exhaust nozzle of the engine illustrated in FIG. 2 during an intermediate, augmented operating condition of the engine.

Illustrated in FIG. 6 is an exemplary intermediate augmented, or wet operating condition or mode of the engine 12 wherein the primary and secondary exhaust flaps 62 and 64 are positioned to form generally open converging and diverging channels 74 and 68, respectively, for powering the aircraft 10 in flight at high levels of thrust greater than the intermediate levels of thrust associated with the dry mode. The converging channel 74 is considered generally open since the inclination angle A is relatively small, which occurs when the primary flaps 62 are positioned for obtaining maximum values of the throat flow area $A_8$. The secondary exhaust flaps 64 are positioned generally open for obtaining relatively high outlet flow area $A_9$, with the half-angle H being, for example, 15° for the intermediate mode illustrated in FIG. 6.

Figure 7:
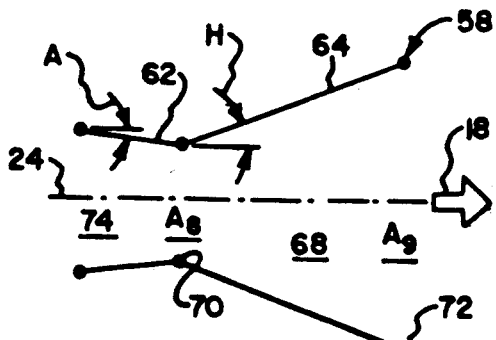
FIG. 7 is a schematic representation of the positions of the primary and secondary exhaust flaps of the exhaust nozzle of the engine illustrated in FIG. 2 during a maximum augmented operating condition of the engine.

FIG. 7 is similar to FIG. 6, however it illustrates the position of the primary and secondary exhaust flaps 62 and 64 during maximum augmented operating condition with maximum thrust obtained from the exhaust gases 18. The primary and secondary flaps 62 and 64 are considered fully open with the throat flow area $A_8$ being maximum and the outlet flow area $A_9$ being maximum. The half-angle H associated with the secondary exhaust flap 64 has a value of about 20° in this exemplary embodiment.

In a conventional aircraft, the exhaust nozzle 58 would be positioned fully open as illustrated in FIG. 7 both during wet operation as well as during ground idle operation, with an attendant flow separation of the exhaust gases 18 during the ground idle operation and relatively high and undesirable thrust from the engines 12. As described above, by positioning the primary and secondary flaps 62 and 64 as illustrated in FIG. 4 during the ground idle mode, thrust is spoiled, or reduced. This reduces the amount of wheel braking required to prevent aircraft rolling and therefore reduces wear on the brakes. The brakes may be used lightly or they need not be utilized at all in some embodiments for preventing rolling of the aircraft 10 which would otherwise occur with relatively high ground idle thrust. Safer performance of the aircraft 10 is also obtained, especially during icy taxiway and runway conditions, since the undesirable relatively high ground idle thrust is spoiled.

In order to obtain the generally three different positions of the primary and secondary exhaust flaps 62 and 64 during ground idle, dry, and augmented operating conditions, it is preferred that the secondary exhaust flaps 64 are positionable in part independently of the primary exhaust flaps 62. A conventional variable area exhaust nozzle includes primary and secondary flaps and a fairing disposed in a conventional four-bar arrangement with actuators for positioning the flaps. Since the flaps and fairings are arranged in a four-bar arrangement, their movements are interdependent, and without additional means would be unable to be positioned in the three required positions during ground idle, dry, and augmented operations described above.

A preferred and exemplary embodiment of an apparatus for carrying out the method of the present invention is illustrated in FIGS. 8 and 9. The exhaust nozzle 58, in this axisymmetric embodiment, includes the annular casing or tailpipe 54, the primary flaps 62, the secondary flaps 64, and the fairings 66. Each of the primary flaps 62 includes an upstream end 76 conventionally pivotally connected to the casing 54, a downstream end 78, an inner surface 80 which faces and confines the combustion gases 18, and an outer surface 82 formed in part by a stiffening rib extending between the upstream and downstream ends 76 and 78. Each of the secondary flaps 64 includes an upstream end 84 conventionally pivotally connected to the primary exhaust flap downstream end 78, a downstream end 86, an inner surface 88 facing towards and confining the combustion gases 18, and an outer surface 90 formed in part by a conventional stifening rib extending between the upstream and downstream ends 84 and 86. Conventional seals 92, some of which are shown in FIG. 3 are suitably positioned between the primary and secondary flaps 62 and 64 for sealing exhaust gases from flowing between adjacent primary and secondary flaps 62 and 64.

Each of the fairings 66 includes an upstream end 94 pivotally connected to the casing 54 as further described hereinbelow, and a downstream end 96 pivotally connected to the secondary exhaust flap downstream end 86.

The exhaust nozzle 58 further includes means 98 for selectively positioning the primary and secondary exhaust flaps 62 and 64 during the three modes of operation: ground idle operating condition, dry operating condition, and augmented operating condition as described above. The positioning means 98 includes a primary ring 100 surrounding the primary flaps 62, a plurality of primary actuators 102, such as hydraulic actuators, conventionally operatively connected to the primary ring 100 for translating the primary ring 100 parallel to the longitudinal centerline axis 24. Each of the primary actuators 102 includes an upstream end 104 suitably pivotally connected to the casing 54, by a spherical joint for example, and an extendable rod 106 suitably pivotally connected to the primary ring 100, by a spherical joint, for example. A plurality of circumferentially spaced primary links 108 pivotally join the primary ring 100 to the downstream ends 78 of the primary flaps 62, for example, by spherical joints.

The positioning means 98 further includes a secondary ring 110 disposed radially outwardly of the primary ring 100 and pivotally joined to the fairing upstream ends 94, for example, by spherical joints. A plurality of secondary actuators 112, which may be conventional hydraulic actuators, are operatively connected to the secondary ring 110 for translating the secondary ring parallel to the longitudinal centerline axis 24. Each of the secondary actuators 112 includes an upstream end 114 suitably pivotally connected to the casing 54 by a spherical joint for example, and an extendable rod 116 pivotally connected to the secondary ring 110 by a spherical joint for example.

During operation, the primary and secondary exhaust flaps 62 and 64 are positionable by the primary and secondary actuators 102 and 112. The primary actuators 102 are effective for translating the primary ring 100 which in turn causes the links 108 to rotate the primary flaps 62 about the primary flap upstream ends 76. The primary flaps 62 may thusly be rotated and positioned in any of the positions illustrated in FIGS. 4–7 and at positions therebetween. The inclination angle A, in the preferred embodiment, may range from about 0° during the ground idle mode illustrated in FIG. 4 to about 35° in the dry mode illustrated in FIG. 5 where the primary flaps 62 are fully closed.

As the primary flaps 62 are rotated, the upstream ends 84 of the secondary exhaust flaps 64 are moved with the movement of the primary flap downstream ends 78. The secondary flap downstream ends 86 are positioned by movement of the fairing 66 caused by movement of the secondary ring 110. The secondary actuators 112 are effective for translating the secondary ring 110 which causes the secondary flaps 64 to rotate relative to the primary flap downstream ends 78. Accordingly, the secondary flaps 64 are positionable in part independently of the primary exhaust flaps 62 since the secondary flap downstream ends 86 may be independently positioned by the secondary ring 110 whereas the secondary flap upstream ends 84 are positioned with, and therefore are dependent upon the position, of the primary flaps 62. The secondary flaps 64 are thus positionable by the positioning means 98 in all of the positions illustrated in FIGS. 4-7.

While there have been described herein what are considered to be preferred embodiments of the present invention, other modifications of the invention shall be apparent to those skilled in the art from the teachings herein, and it is, therefore, desired to be secured in the appended claims, all such modifications as fall within the true spirit and scope of the invention.

More specifically, and for example only, although the invention has been described with respect to an axisymmetric, variable area exhaust nozzle, it may also be utilized with two dimensional converging-diverging types of exhaust nozzles which are generally rectangular in flow cross section. It may also be utilized in conjunction with yet other types of exhaust nozzles, including non-symmetric nozzles.

Furthermore, although the positioning means 98 as disclosed above is preferred, other means for positioning the primary and secondary exhaust flaps 62 and 64 for obtaining all of the positions thereof as illustrated in FIGS. 4-7 may be utilized in accordance with the invention for obtaining thrust spoiling at ground idle operating condition, while also being able to position the primary and secondary flaps 62 and 64 at different positions for both dry and augmented operations.

Accordingly, what is desired to be secured by Letters Patent of the United States is the invention as defined and differentiated in the following claims:

I claim:

1. An exhaust nozzle for an aircraft engine comprising:
   a casing;
   a primary exhaust flap having an upstream end pivotally connected to said casing, a downstream end, and an inner surface for channeling combustion gases;
   a secondary exhaust flap having an upstream end pivotally connected to said primary exhaust flap downstream end, a downstream end, and an inner surface for channeling combustion gases;
   a fairing having an upstream end pivotally connected to said casing and a downstream end pivotally connected to said secondary exhaust flap downstream end; and
   means for selectively positioning said primary and secondary exhaust flaps together in different positions:
      during a ground idle operating condition to position said primary flap to a fully open position, and to form a diverging channel defined by said secondary exhaust flap for diffusing said combustion gases while maintaining attachment of said combustion gases along said secondary exhaust flap for spoiling thrust;
      during a dry operating condition to form generally closed converging and diverging channels defined by said primary and secondary exhaust flaps, respectively, for powering an aircraft in flight at intermediate levels of thrust greater than said spoiled thrust at said ground idle operating condition; and
      during a maximum augmented operating condition to form fully open converging and diverging channels defined by said primary and secondary exhaust flaps, respectively, for powering said aircraft in flight at maximum thrust greater than said intermediate levels of thrust.

2. An exhaust nozzle according to claim 1 wherein said positioning means is effective for positioning said primary exhaust flap to a fully open position generally parallel to a longitudinal centerline axis of said exhaust nozzle at said ground idle operating condition.

3. An exhaust nozzle according to claim 1 wherein said positioning means is effective for positioning said secondary exhaust flap downstream end independently of said primary exhaust flap.

4. An exhaust nozzle according to claim 3 further including:
   a plurality of circumferentially spaced ones of said primary exhaust flaps disposed axisymmetrically about a longitudinal centerline axis of said nozzle;
   a plurality of circumferentially spaced ones of said secondary exhaust flaps; and
   a plurality of circumferentially spaced ones of said fairings; and
   wherein said positioning means comprises:
      a primary ring surrounding said primary exhaust flaps;
      a plurality of primary actuators operatively connected to said primary ring for translating said primary ring parallel to said longitudinal centerline axis;
      a plurality of circumferentially spaced primary links pivotally joining said primary ring to said primary exhaust flaps;
      a secondary ring pivotally joined to said fairing upstream ends; and
      a plurality of secondary actuators operatively connected to said secondary ring for translating said secondary ring parallel to said longitudinal centerline axis.

5. An exhaust nozzle according to claim 4 wherein said positioning means is effective for positioning said primary exhaust flaps to a fully open position generally parallel to said longitudinal centerline axis of said exhaust nozzle, and positioning said secondary exhaust flaps at angles relative to said longitudinal centerline axis up to about 15° at said ground idle operating condition.

6. An exhaust nozzle according to claim 5 wherein said positioning means is effective for positioning said secondary exhaust flaps at an angle relative to said longitudinal centerline axis of about 10° for maintaining a preselected flow separation margin of said combustion gases flowable along said secondary exhaust flap inner surfaces.

7. An exhaust nozzle according to claim 4 in combination with said gas turbine engine, said engine including a compressor effective for providing bleed-air at a pressure of at least 40 psia at said ground idle operating condition, and said positioning means is effective for positioning said primary exhaust flaps to a fully open position generally parallel to said longitudinal centerline axis of said exhaust nozzle, and positioning said secondary exhaust flaps at angles relative to said longitudinal centerline axis up to about 15° at said ground idle operating condition.

8. An exhaust nozzle according to claim 4 in combination with said gas turbine engine in an aircraft having wheels and said positioning means is effective for positioning said primary exhaust flaps to a fully open position generally parallel to said longitudinal centerline axis of said exhaust nozzle, and positioning said secondary exhaust flaps at said ground idle condition at angles relative to said longitudinal centerline axis up to about 15° so that thrust from said engine is insufficient to cause said aircraft to roll on said wheels.

* * * * *